July 17, 1923.  
S. KERSTEN  
1,462,413  
COMBINATION FAUCET AND MIXING NOZZLE  
Filed March 24, 1921  2 Sheets-Sheet 1

Inventor.  
Samuel Kersten.  
By Gabel & Mueller  
Attys

July 17, 1923.
S. KERSTEN
1,462,413
COMBINATION FAUCET AND MIXING NOZZLE
Filed March 24, 1921  2 Sheets-Sheet 2
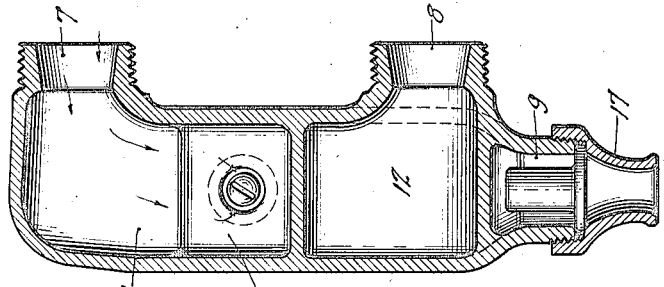
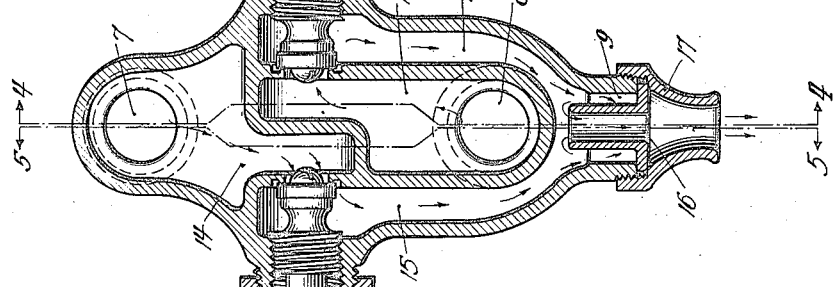
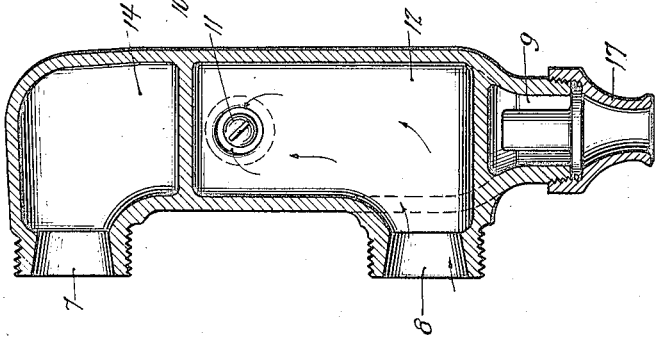
Inventor
Samuel Kersten.
By: Gabel + Mueller
Attys.

Patented July 17, 1923.

1,462,413

UNITED STATES PATENT OFFICE.

SAMUEL KERSTEN, OF CHICAGO, ILLINOIS.

COMBINATION FAUCET AND MIXING NOZZLE.

Application filed March 24, 1921. Serial No. 455,210.

*To all whom it may concern:*

Be it known that I, SAMUEL KERSTEN, a citizen of the United States, residing at Chicago, in the county of Cook and State of Illinois, have invented a certain new and useful Improvement in Combination Faucets and Mixing Nozzles, of which the following is a full, clear, concise, and exact description, reference being had to the accompanying drawings, forming a part of this specification.

My invention relates to faucets and has to do more particularly with the provision of a combination faucet and mixing nozzle.

One of the features of my invention is the provision of a hot and cold water faucet having certain features of interarrangement whereby a universal operation thereof is secured; that is, the faucet may be connected to hot and cold water pipes arranged one above the other respectively and whereby the faucet may be connected vertically on either side of the pipes with the hot water valves always on the left hand side.

Another feature of my invention is the provision of an improved mixing nozzle which also produces a steady flow of water in a solid stream as it leaves the faucet.

Other features of my invention will be more particularly pointed out in the ensuing specification and claims.

For a better understanding of my invention, reference is to be had to the accompanying drawings in which Fig. 1 is a front view of the preferred form of my invention;

Fig. 3 is a longitudinal cross section along the line 3—3 of Fig. 2;

Fig. 4 is a vertical cross section along the line 4—4 of Fig. 3 and

Fig. 5 is a vertical cross section along the line 5—5 of Fig. 3.

Figure 1:
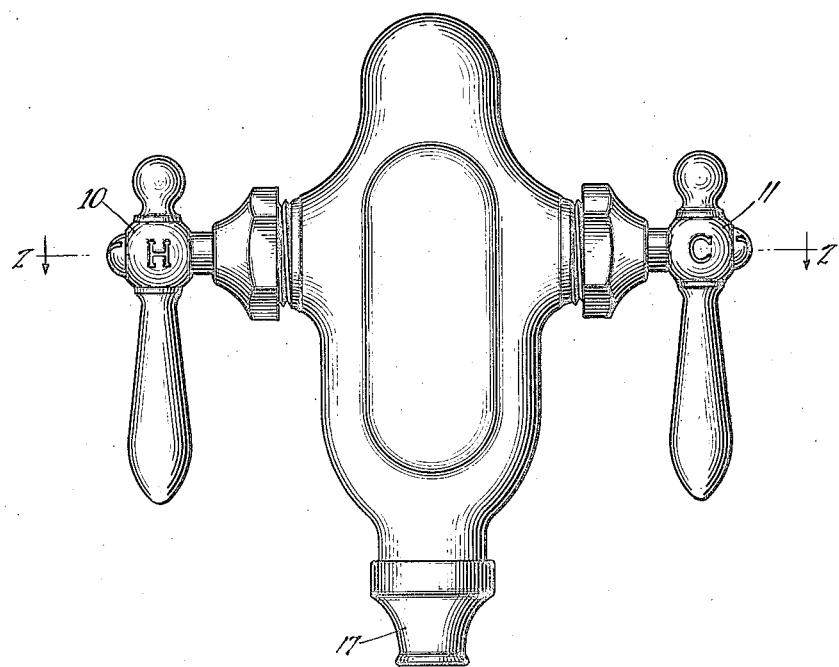
Figure 2:
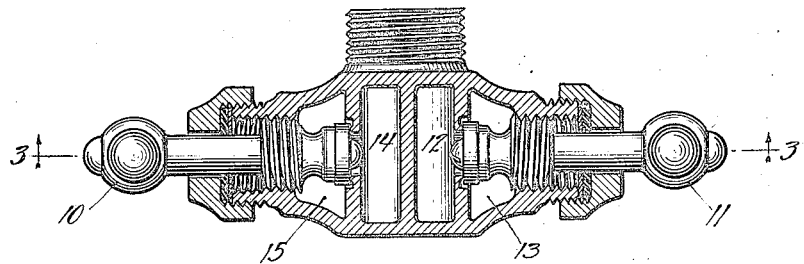
Fig. 2 is a transverse cross section along the line 2—2 of Fig. 1.

Referring now more in detail to my invention as illustrated, it comprises a main body portion having an upper inlet 7 and a lower inlet 8 adapted particularly for use with hot and cold water connections respectively. At the lower end of the body is an outlet mouth 9 which is connected by passages with the hot and cold water inlets and which passages are controlled by the hot and cold water valves 10 and 11 respectively, which valves extend laterally from the body portion and are positioned intermediate of the upper and lower intakes thereby providing a most compact arrangement.

As to the connecting passages, the lower or cold water inlet is connected to the mouth or outlet of the faucet by the passage 12 which extends upwardly and is controlled by the valve 11 then extending downwardly at 13 to the faucet outlet 9. The flow of the water is indicated by the arrows which lead from the inlet 8 along the passages 12 and 13 to the outlet. The hot water passage extends from the inlet 7 along the left hand side of the body taking a path including chamber 14, then through the port of hot water valve 10, left hand downwardly extending passage 15 to the mouth of the body, the path of hot water being indicated by the arrows leading from the hot water inlet 7 downwardly along the said passage on the left side of the body.

It will be apparent that with the faucet connected to hot and cold water sources, upon opening the valves 10 and 11 the hot and cold water will flow through the respective valves and along separate passages to the mouth. Now in order to thoroughly mix the hot and cold water I provide an improved mixing nozzle which not only thoroughly mixes the hot and cold water but also produces a steady, solid stream of water at the nozzle. To this end I provide a flanged tube 16, the outer diameter of the tubular portion of which is smaller than the mouth of the body so as to provide a space in which the hot and cold water as it comes down to the mouth thoroughly intermixes before leaving the faucet. The path of this water is indicated by the arrows which lead downwardly from the passages 13 and 15 and then upwardly and downwardly through the nozzle. Thus, this impedance to the direct outflow of the water is sufficient to thoroughly intermix the same. The water as it is forced downwardly impinges not only against the sides of the tube but also upon the flange thereof.

In order to effect a steady, solid stream of water and prevent a splashing thereof after the mixing thereof caused by the swirling motion imparted thereto, I provide an outer nozzle 17 having an outlet larger than the passage through the tube 16. This arrangement I have found, overcomes the otherwise separated stream which would flow directly from the tubular insert 16. Thus where the faucet is used for washing purposes and is set above the sink, the steady, solid stream of water does not splash as where it is separated more.

The faucet as referred to herein is particularly useful for wash sinks in factories where a number of the faucets are positioned above long sinks and on opposite sides of centrally disposed pipes so that the workmen can line up along each side of the sink which is set out on the floor, each man having an individual faucet. In certain localities the law requires individual faucets for the men and with wash sinks which cannot be stopped up to hold a supply of water but permitted to drain off immediately. In such uses it is, of course, very desirable that the hot and cold water be thoroughly intermixed before leaving the faucet and also run out in a stream which will not splash. Also it is very desirable to have the valves disposed in a predetermined relation, preferably with the hot water valve always to the left and the cold water valve always to the right. This is a universal arrangement. In installing wash sinks of the character referred to above, I arrange the hot and cold water pipes longitudinally on the sink and a sufficient distance above the sink so that the workmen will have ready access to the water as it leaves the faucet. The hot water pipes are positioned directly above the cold water pipes.

With my improved faucet I am enabled to connect a number of them along the sink on each side of the hot and cold water pipes in the simplest way, providing simple cross connections along the pipes to which the faucets may be connected on opposite sides. Furthermore, the valve handles are always in the same position relative to the body as the workmen face the faucet, that is with the hot water valve on the left and the cold water valve on the right.

What I claim as new and desire to secure by United States Letters Patent is:

1. A mixing faucet comprising a body having upper and lower intakes and an outlet, left and right hand valves, separated outer passages extending downwardly around the lower intake along opposite outer lateral walls of the body from the outlet sides of the valve ports to the body outlet, inner passages in the body connecting the intake sides of the valve ports with the upper and lower body intakes, and suitable inner walls separating the inner and outer passages.

2. A mixing faucet comprising a vertically disposed elongated body having upper and lower rearwardly extending inlets, left and right valves laterally extending in a plane between the upper and lower inlets, an outlet at the lower end of the body, a passage extending downwardly along the left side of the body from the upper inlet around one side of the lower inlet to the outlet controlled by the left side valve, and a passage extending from the lower inlet upwardly to the right hand valve and then downwardly around the other side of the lower inlet to the outlet.

3. Mixing faucet comprising an elongated integral body having upper and lower rearwardly extending intakes and an outlet aligned in a vertical plane, left and right hand valves extending laterally from said body and aligned in a horizontal plane and positioned between the upper and lower intakes, a vertical left inner wall extending parallel to the outer body wall downwardly past the lower intake forming a vertical passage from the left hand valve to the outlet, a vertical right inner wall extending parallel to the outer body wall downwardly past the lower intake forming a vertical passage from the right hand valve to the outlet, said inner walls having ports and seats for the corresponding valves, and separated passages from the inlet to the valve ports and seats.

4. A mixing faucet comprising a body member having hot and cold water inlets and a common outlet below the inlets all aligned one above the other in a vertical plane extending axially therethrough with valves controlling downwardly extending passages from the inlets to the outlet, of a mixing nozzle therefor, including a short annular chamber below the lower inlet surrounding a central tubular outlet open throughout its length and extending upwardly into the common outlet so as to cause downwardly flowing entering hot and cold water to intermix in said annular chamber before passing out through the tubular outlet.

In witness whereof I hereunto subscribe my name this 7th day of March, A. D. 1921.

SAMUEL KERSTEN.